Sept. 15, 1959   A. G. ENOCK   2,904,082
APPARATUS FOR FILLING BOTTLES OR LIKE CONTAINERS
Filed Jan. 6, 1958   3 Sheets-Sheet 1

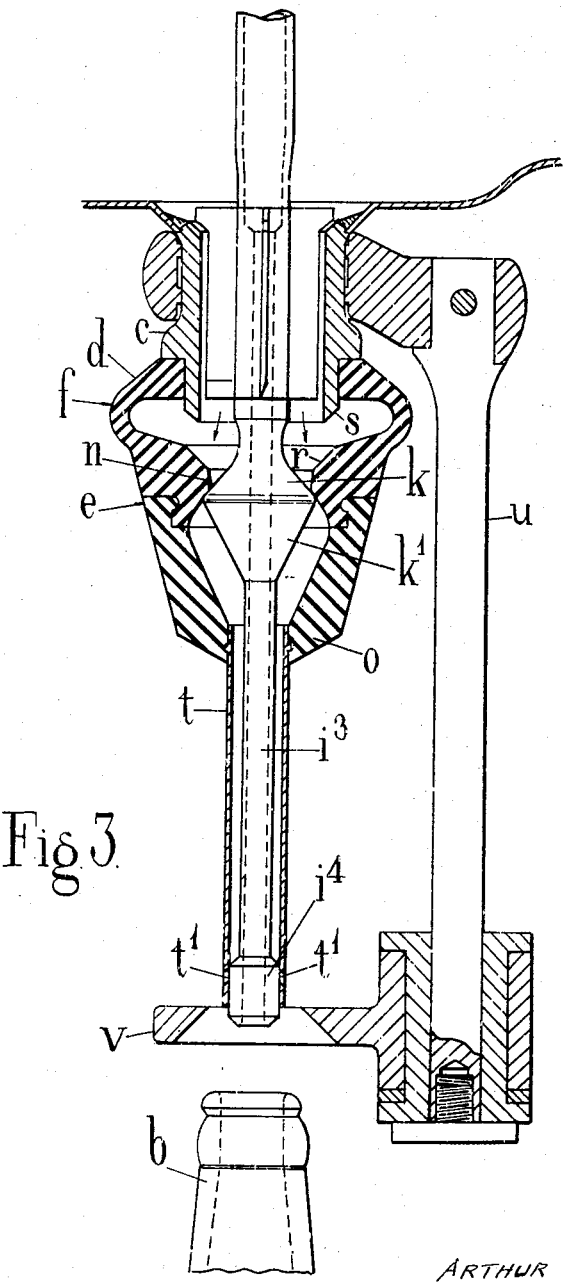

United States Patent Office 2,904,082
Patented Sept. 15, 1959

2,904,082

APPARATUS FOR FILLING BOTTLES OR LIKE CONTAINERS

Arthur Graham Enock, London, England, assignor to Graham-Enock Manufacturing Co. Limited, London, England Application January 6, 1958, Serial No. 707,300

Claims priority, application Great Britain January 24, 1957

5 Claims. (Cl. 141—295)

This invention relates to apparatus or machines for filling receptacles such as bottles or like containers with liquid. Machines with which the present invention is concerned incorporate filling valves operable to pass the liquid from a storage container or bowl into the bottles or the like to be filled, the filling being aided by subjecting the bottles or the like to a vacuum produced above the liquid level in the container and conveyed to such bottles by means of an air tube.

The invention is particularly applicable to milk bottle filling machines and in such machines filling valves are known in which the valve seat, usually upon the end of the air tube, enters the neck of the bottle during filling and thereby restricts the flow of milk into the bottle.

It is an object of the persent invention to avoid the above disadvantage and to provide improvements in the construction of the filling valve whereby the flow of liquid from the valve into the bottle or the like is improved and thus the rate of filling of such bottle is increased.

A filling valve constructed in accordance with the invention comprises a valve seat forming member, two-part means having a valve seating surface comprising an upper valve part normally seating on the valve seat and a lower receptacle contacting part having a surface for contact by the receptacle to raise the valve part from off its seat, and air passage means passing through said two-part means for entry into the receptacle to subject the latter to a vacuum, the arrangement being such that the valve seating surface of said upper valve part is above the receptacle contacting surface of the lower receptacle contacting part so that the receptacle operates to raise the valve part from its seat without the latter entering the receptacle.

The filling valve in one form has its two-part means in the form of a hollow resilient member having an open lower bottle contacting end and a valve portion formed internally thereof and spaced above its open end, an air passage means passing through said member for entry into the bottle, and the valve seat being upon the air passage means, said hollow member being operable by the bottle to raise its valve portion from the valve seat and thereby permit free flow of liquid first past the valve seat, then through the lower bottle contacting end of the hollow member for entry into the bottle.

The invention will be described in one form by way of example as applied to a machine for filling milk bottles which incorporates a container or bowl for storing a quantity of milk. The level of the milk in the bowl is maintained by a float controlled valve in a main milk supply pipe line, and the space above the milk in the bowl is subject to a vacuum produced by any suitable form of vacuum producer unit.

Referring to the accompanying drawings:

Figure 3 is a modified form of valve constructed according to the invention, and adapted to the filling of bottles having a somewhat long narrow neck such as sterilized milk bottles.

Figure 1:
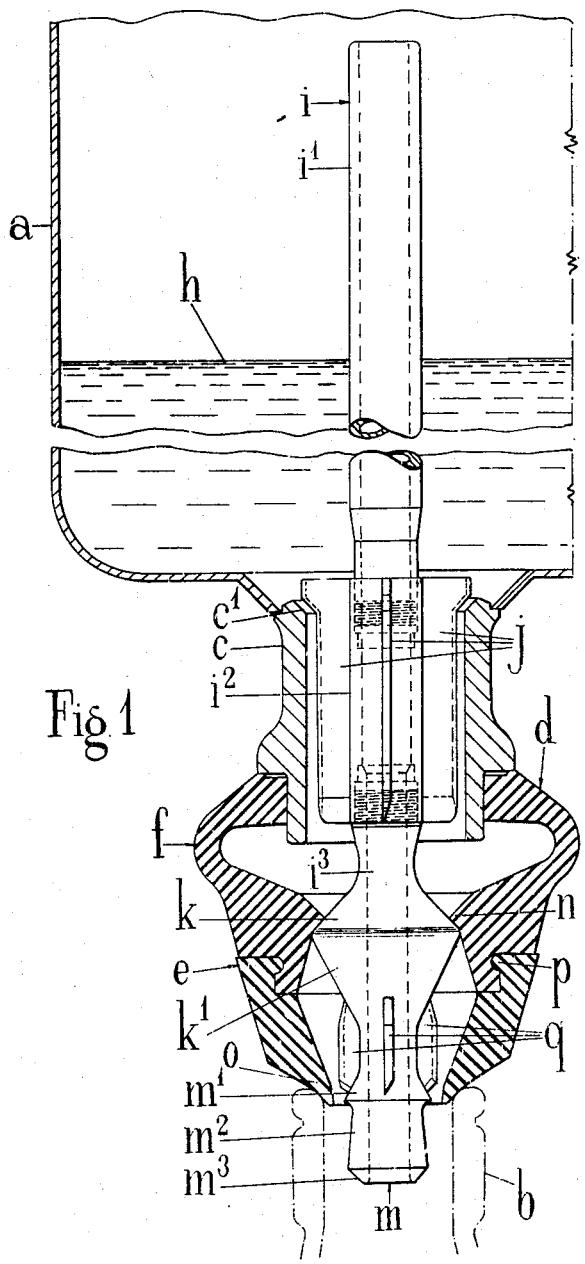
Figure 1 is a cross-sectional elevation of a filling valve for milk bottles constructed in one convenient form in accordance with the invention, the valve being shown in a closed position; whilst
Figure 2:
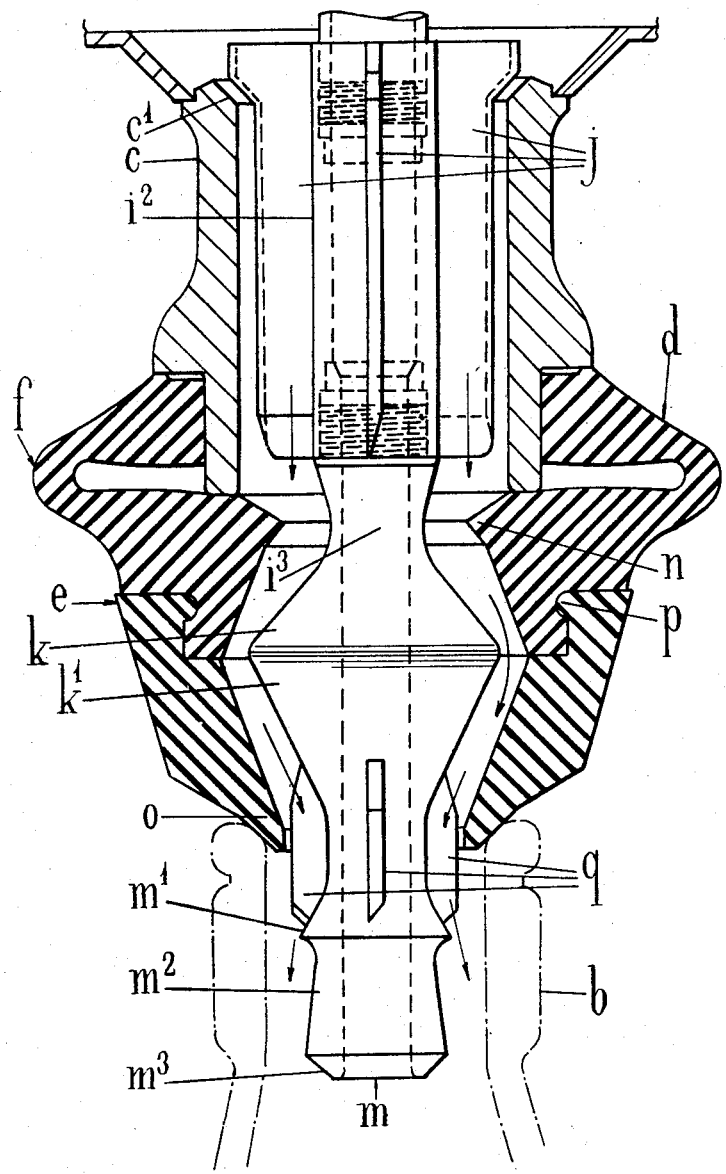
Figure 2 is a view similar to that of Figure 1 but with the valve open.

As shown in Figures 1 and 2 the milk bowl $a$ is provided at its base with bottle filling valve means operable on the raising of an empty milk bottle $b$ to release milk from the bowl to the bottle. The valve means, in the example being described, has a cylindrical casing member $c$ of metal or other suitable material secured at its upper end, preferably by welding, to the cylindrical edge of an aperture in the base of the bowl.

Carried by the lower end of the casing member $c$ is a hollow resilient member formed from rubber or any other suitable and like resilient material. This resilient member comprises upper and lower portions $d$ and $e$ respectively, the upper portion $d$ being expanded to grip tightly upon a reduced end of the casing member. The juncture $f$ of the upper and lower portions is in cross section of horizontally disposed U form and the lower portion continues downwardly in a reduced and tapering external diameter to form a bottle contacting or nozzle end to be referred to later.

Extending from above the level $h$ of the milk in the bowl $a$ and passing through the casing $c$ and resilient member is an air tube indicated generally at $i$, the bore of which communicates the vacuum in the bowl with the interior of the bottle to be filled. As shown this air tube is in three sections, an upper section $i'$, and intermediate section $i^2$ and a lower section $i^3$, and the upper and lower sections are screw-threaded into the top and bottom respectively of the intermediate section. The intermediate section $i^2$ is located within the casing member $c$ and has radiating therefrom three thin fins $j$ which rest upon the top edge $c'$ of casing $c$ for supporting and centralising the air tube within the casing and resilient member. The section $i^3$ of the air tube within the resilient member has a portion of its outer surface of double conical form with the top cone portion $k$ merging with a radius into the section $i^2$ of the air tube. This top cone portion $k$ provides a valve seating surface to be referred to later. The lower cone portion $k'$ tapers more gradually than the top cone and merges with a radius into the lower end of the air tube section $i^3$, this lower end projecting out of the resilient member in the form of a nozzle end indicated generally at $m$.

The lower portion $e$ of the resilient member provides a two-part means comprising an upper valve forming part $n$ and a lower bottle contacting part $o$. As shown the bottle contacting part $o$ is separate from the valve part $n$ and the two parts are formed for interengagement as shown at $p$ so that they may be removably locked together to facilitate replacement, repair or cleaning. The upper valve part $n$ of the resilient member opposes the valve seating surface of the top cone portion $k$ of the air tube section $i^3$, and is normally seated thereon to cut off liquid flow as shown in Figure 1. Radiating from the air tube section $i^3$ are three thin fins or vanes $q$ positioned such that they provide guide means for the open end of the bottle contacting part $o$ as the latter is raised by a bottle to be filled.

The lower nozzle end $m$ of section $i^3$ of the air tube as shown consists of top and bottom portions $m'$ and $m^3$ respectively and an intermediate portion $m^2$. The top portion $m'$ is tapered such that it directs the milk flow towards the interior surface of the bottle in order to avoid frothing and turbulence of the milk, whilst the bottom portion $m^3$ is tapered to guide the bottle towards the lower part $o$ of the resilient member.

Figure 3 illustrates a form of valve adapted to the filling of a bottle having a somewhat long narrow neck such as sterilized milk bottles. This valve is similar in construction to that shown in Figures 1 and 2, but in addition there is provided on the internal surface of the valve forming part $n$ of the resilient member, an inclined stop forming portion $r$. The reduced lower end of casing member $c$ is also inclined or tapered as indicated at $s$ to correspond with the inclined portion $r$ of the part $n$ of the resilient member. By this means when the lower portion $e$ of the resilient member is raised by a contacting bottle its upward movement is controlled by its stop portion $r$ abutting against the inclined stop forming portion $s$ of casing member $c$. In order to permit the filling of bottles having long narrow necks the open end of the lower portion $e$ of the resilient member is fitted with a tube $t$. The latter is formed with apertures $t'$ at its lower end and normally these apertures are closed by a valve forming enlargement $i^4$ at the end of an extension of the air tube section $i^3$. The casing $c$ supports a part $u$ upon which is slidably mounted a bottle guide $v$. As the bottle $b$ is raised for filling it is guided by the guide $v$ which slides upon the part $u$ at the same time as the tube $t$ enters the bottle.

With the above described constructions, as a milk bottle is raised for filling, its neck contacts the part $o$ of the lower portion $e$ of the resilient member and moves the latter to raise its valve part $n$ off the valve seat $k$ upon the air tube $i$ and permit a smooth non-turbulent flow of milk over the valve seat $k$ and through the annular form of passage provided between the outer surface of the lower coned portion $k'$ of the air tube and the similarly shaped internal surface of the bottle contacting part $o$ of the resilient member. In the Figures 1 and 2 construction the milk leaving the resilient member then flows into the bottle by way of the annular passage formed between the outer surface of the nozzle end $m$ of the air tube and the internal surface of the bottle neck. In the Figure 3 construction the milk leaving the resilient member then flows down the tube $t$ and through the apertures $t'$ onto the wall of the bottle, the apertures being opened by the lifting of the tube $t$ as the lower portion $e$ of the resilient member is raised by the bottle.

In known forms of filling valve the valve seat has been incorporated in the lower nozzle end of the air tube, resulting in a restricted size of annular passage formed in the bottle neck by the nozzle end and therefore an undesirable obstruction to the milk flow. By means of the present invention the valve seat is located outside the bottle neck during filling thereby permitting the obtaining of a maximum possible size of annular passage by which the flow of milk is improved and the rate of bottle filling speeded up. Such an improvement also permits a reduction in the number of filling valves per bottle filling machine.

I claim:
1. A filling device for receptacle filling machines comprising a hollow member formed of resilient material, vacuum creating air passage means passing through the hollow member for entry into the receptacle, a valve seat upon said air passage means and located within said hollow member, a valve member provided upon and located internally of said hollow member for co-operation with said valve seat, and an outlet nozzle provided upon said hollow member and spaced from said valve member so as to provide liquid passage means between the valve member and outlet nozzle, the outlet nozzle being operable by the receptacle to raise the valve member from off said valve seat and thereby permit flow of liquid through the passage means into the receptacle.

2. A filling device as claimed in claim 1, characterised in that the air passage means has a portion of double conical form with an upper cone portion forming the valve seat, and that the internal surface of the hollow member below the valve member is shaped such that when the valve member is raised from its seat the said liquid passage means takes substantially a double conical annular form of passage through which the liquid may freely flow.

3. A filling device as claimed in claim 1, characterized in that the hollow member is formed by separate upper and lower sections, the upper section incorporating the valve member and the lower section the outlet nozzle, and the said sections being formed with interengaging means by which the resilient material permits them to be removably locked together to facilitate replacement, repair and cleaning.

4. A filling device as claimed in claim 1, characterized in that the hollow member is provided internally thereof and adjacent its valve member with a stop forming portion coacting with the lower end of a casing member supporting the hollow member so as to limit movement of the valve member as it is raised from its seat.

5. A filling device as claimed in claim 1, wherein the outlet nozzle of the hollow member has a tube depending therefrom which enters the receptacle during filling and which has apertures therein through which liquid flows into the receptacle when the valve member is raised from its seat.

References Cited in the file of this patent
UNITED STATES PATENTS

| | | |
|---|---|---|
| 2,499,149 | Lippold | Feb. 28, 1950 |
| 2,501,764 | Duer | Mar. 28, 1950 |
| 2,724,535 | Day et al. | Nov. 22, 1955 |
| 2,746,663 | Day et al. | May 22, 1956 |